US012645502B2

(12) United States Patent
Yang

(10) Patent No.: US 12,645,502 B2
(45) Date of Patent: Jun. 2, 2026

(54) INFORMATION PROCESSING METHOD AND APPARATUS FOR COMPUTER ANIMATION RESOURCE OF COMPUTER ANIMATION DEVELOPMENT PROJECT, DEVICE, MEDIUM AND PRODUCT

(71) Applicant: Beijing Zitiao Network Technology Co., Ltd., Beijing (CN)

(72) Inventor: Jichang Yang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 637 days.

(21) Appl. No.: 17/928,895

(22) PCT Filed: Sep. 21, 2022

(86) PCT No.: PCT/CN2022/120350
§ 371 (c)(1),
(2) Date: Nov. 30, 2022

(87) PCT Pub. No.: WO2023/216491
PCT Pub. Date: Nov. 16, 2023

(65) Prior Publication Data
US 2024/0103928 A1     Mar. 28, 2024

(30) Foreign Application Priority Data

May 13, 2022     (CN) .......................... 202210523709.4

(51) Int. Cl.
*G06F 9/46*          (2006.01)
*G06F 9/50*          (2006.01)
(52) U.S. Cl.
CPC .................................. *G06F 9/5055* (2013.01)

(58) Field of Classification Search
CPC ...................................................... G06F 9/5055
See application file for complete search history.

(56) References Cited

U.S. PATENT DOCUMENTS

2014/0280323 A1     9/2014   Seales

FOREIGN PATENT DOCUMENTS

CN          108228846 A       6/2018
CN          110084486 A       8/2019
(Continued)

OTHER PUBLICATIONS

European Patent Office, Office Action and Search Report Issued in Application No. 22808579.1, Jan. 10, 2024, 13 pages.
(Continued)

*Primary Examiner* — Gregory A Kessler
(74) *Attorney, Agent, or Firm* — Alleman Hall LLP

(57)          ABSTRACT
Embodiments of the present disclosure provide an information processing method and apparatus for an animation resource, an electronic device, a storage medium, a computer program product and a computer program. The method includes: detecting a project management request initiated by a first user for a target project; displaying resource file information corresponding to an animation resource of the target project in response to the project management request; and detecting a resource management operation performed by the first user for the resource file information, and determining target file information obtained after execution of the resource management operation; where the target file information is configured to record resource processing content corresponding to the animation resource of the target project. Therefore, the problem of low efficiency in managing animation resources is solved.

19 Claims, 7 Drawing Sheets

Detect a project management request initiated by a first user for a target project — 201

Display resource file information corresponding to an animation resource of the target project in response to the project management request — 202

Detect a resource management operation performed by the first user for the resource file information, and determine target file information obtained after execution of the resource management operation — 203

(56)    References Cited

FOREIGN PATENT DOCUMENTS

| | | | |
|---|---|---|---|
| CN | 106843936 | B | 12/2019 |
| CN | 110633250 | A | 12/2019 |
| CN | 110806865 | A | 2/2020 |
| CN | 112348928 | A | 2/2021 |
| CN | 112396677 | A | 2/2021 |
| CN | 112650712 | A | 4/2021 |
| CN | 112870724 | A | 6/2021 |
| CN | 113744377 | A | 12/2021 |
| CN | 114404996 | A | 4/2022 |
| CN | 114911595 | A | 8/2022 |
| JP | H0944393 | A | 2/1997 |

OTHER PUBLICATIONS

Li, B., "Design and Implementation of 3D animation making and management system," Thesis for Masters Degree, School of Information Science and Engineering, Shandong University, 91 pages. (Submitted with English Abstract).

First Office Action for Chinese Application No. 202210523709.4, mailed on May 15, 2025, 29 pages.

China National Intellectual Property Administration, Office Action and Search Report Issued in Application No. 202210523709.4, Nov. 3, 2025, 47 pages.

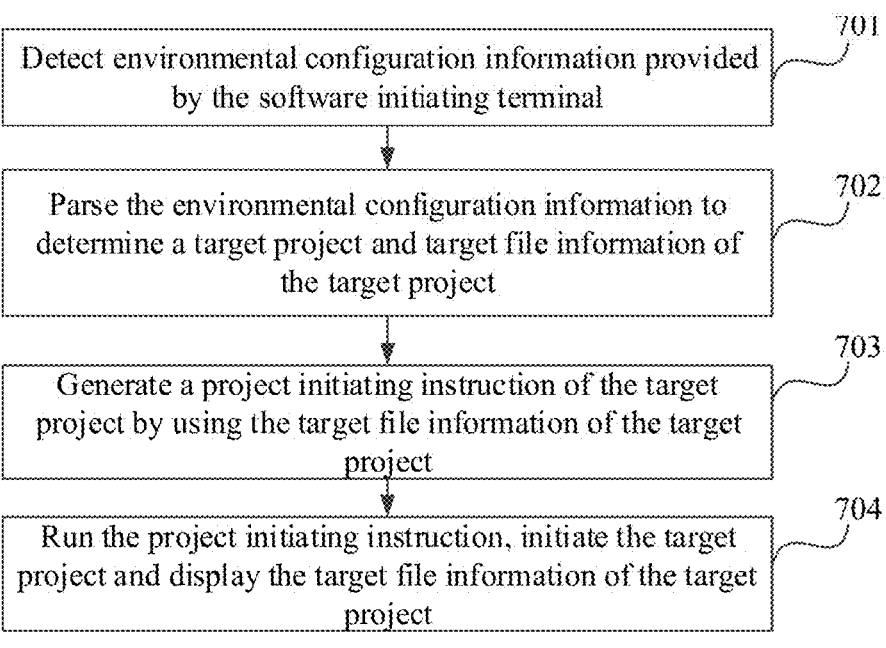

Detect environmental configuration information provided by the software initiating terminal — 701

Parse the environmental configuration information to determine a target project and target file information of the target project — 702

Generate a project initiating instruction of the target project by using the target file information of the target project — 703

Run the project initiating instruction, initiate the target project and display the target file information of the target project — 704

FIG. 7

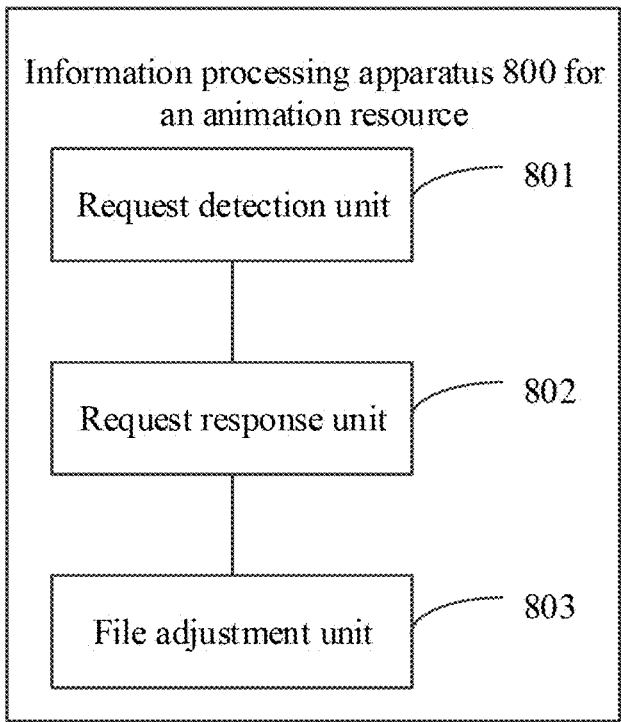

Information processing apparatus 800 for an animation resource

Request detection unit — 801

Request response unit — 802

File adjustment unit — 803

FIG. 8

INFORMATION PROCESSING METHOD AND APPARATUS FOR COMPUTER ANIMATION RESOURCE OF COMPUTER ANIMATION DEVELOPMENT PROJECT, DEVICE, MEDIUM AND PRODUCT

CROSS-REFERENCE TO RELATED APPLICATIONS

This application is a national stage of International Application No. PCT/CN2022/120350, filed on Sep. 21, 2022, which claims a priority of the Chinese Patent Application No. 202210523709.4 filed on May 13, 2022. Both of the aforementioned applications are hereby incorporated by reference in their entireties.

TECHNICAL FIELD

Embodiments of the present disclosure relate to the field of computer technology, and in particular to an information processing method and apparatus for an animation resource, an electronic device, a storage medium, a computer program product and a computer program.

BACKGROUND

Computer graphics (CG) is a kind of graphics drawn by computer software, which can be used in many fields such as games, image mapping, information processing, etc. The computer software for drawing an animation may include digital content creation (DCC) software, such as autodesk maya (Maya) software and texture mapping and painting (Substance, Substance Painter) software.

In actual development projects, many animations will be involved. The animations are used as a kind of data resource in the projects and are developed or processed by project developers. These animations in the projects can be called animation resources. However, in the prior arts, there is a lack of a procedure for effectively managing animation resources of a project, thereby resulting in low efficiency in managing the animation resources.

SUMMARY

Embodiments of the present disclosure provide an information processing method and apparatus for an animation resource, an electronic device, a storage medium, a computer program product and a computer program, so as to overcome the problem of low efficiency in managing the animation resource.

In a first aspect, an embodiment of the present disclosure provides an information processing method for an animation resource, including:

detecting a project management request initiated by a first user for a target project;

displaying resource file information corresponding to an animation resource of the target project in response to the project management request; and detecting a resource management operation performed by the first user for the resource file information, and determining target file information obtained after execution of the resource management operation;

where the target file information is configured to record resource processing content corresponding to the animation resource of the target project.

In a second aspect, an embodiment of the present disclosure provides an information processing method for an animation resource, including:

acquiring target file information of a target project in response to a project initiating operation performed by a third user for the target project, where the target file information is obtained after execution of a resource management operation by a first user for resource file information of the target project;

determining environmental configuration information of the target project by using the target file information; and controlling an animation drawing program to initiate the target project, based on the environmental configuration information, where the animation drawing program is configured to draw a corresponding animation resource according to the target file information of the target project, and the target file information is configured to record resource processing content corresponding to the animation resource of the target project.

In a third aspect, an embodiment of the present disclosure provides an information processing method for an animation resource, including:

detecting environmental configuration information provided by a software initiating terminal;

parsing the environmental configuration information to determine a target project and target file information of the target project, where the target file information is obtained after execution of a resource management operation by a first user for resource file information of the target project;

generating a project initiating instruction of the target project by using the target file information of the target project; and running the project initiating instruction, initiating the target project and displaying the target file information of the target project; where the target file information is configured to record resource processing content corresponding to the animation resource of the target project.

In a fourth aspect, an embodiment of the present disclosure provides an information processing apparatus for an animation resource, including:

a request detection unit, configured to detect a project management request initiated by a first user for a target project;

a request response unit, configured to display resource file information corresponding to an animation resource of the target project in response to the project management request; and a file adjustment unit, configured to detect a resource management operation performed by the first user for the resource file information, and determine target file information obtained after execution of the resource management operation;

where the target file information is configured to record resource processing content corresponding to the animation resource of the target project.

In a fifth aspect, an embodiment of the present disclosure provides an information processing apparatus for an animation resource, including:

an initiation response unit, configured to acquire target file information of a target project in response to a project initiating operation performed by a third user for the target project, where the target file information is obtained after execution of a resource management operation by a first user for resource file information of the target project;

an environment configuration unit, configured to determine environmental configuration information of the target project by using the target file information; and a project initiating unit, configured to control an animation drawing program to initiate the target project, based on the environmental configuration information, where the animation drawing program is configured to draw a corresponding animation resource according to the target file information of the target project, and the target file information is configured to record resource processing content corresponding to the animation resource of the target project.

In a sixth aspect, an embodiment of the present disclosure provides an information processing apparatus for an animation resource, including:

an information acquiring unit, configured to detect environmental configuration information provided by a software initiating terminal;

an information parsing unit, configured to parse the environmental configuration information to determine a target project and target file information of the target project, where the target file information is obtained after execution of a resource management operation by a first user for resource file information of the target project;

an instruction generating unit, configured to generate a project initiating instruction of the target project by using the target file information of the target project; and an instruction running unit, configured to run the project initiating instruction, initiate the target project and display the target file information of the target project, where the target file information is configured to record resource processing content corresponding to the animation resource of the target project.

In a seventh aspect, an embodiment of the present disclosure provides an electronic device including at least one processor and a memory;

the memory stores computer-executable instructions;

the at least one processor executes the computer-executable instructions stored in the memory, so as to cause the at least one processor to execute the information processing method for the animation resource according to the above first aspect, second aspect or third aspect.

In an eighth aspect, an embodiment of the present disclosure provides a computer readable storage medium storing computer-executable instructions which, when executed by a processor, implement the information processing method for the animation resource according to the above first aspect, second aspect or third aspect.

In a ninth aspect, an embodiment of the present disclosure provides a computer program product including a computer program which, when executed by a processor, implements the information processing method for the animation resource according to the above first aspect, second aspect or third aspect.

In a tenth aspect, an embodiment of the present disclosure provides a computer program which, when executed by a processor, implements the information processing method for the animation resource according to the above first aspect, second aspect or third aspect.

Embodiments of the present disclosure provide an information processing method and apparatus for an animation resource, an electronic device, a storage medium, a computer program product and a computer program. Through resource file information corresponding to an animation resource of a target project, the animation resource can be managed more accurately and efficiently according to the method, and the resource file information can record attribute information of the animation resource, such as a resource name, a type, creation time and other information. By operating the resource file information of the animation resource, file content of the animation resource can be managed to obtain target file information. The target file information can be used to record resource processing content of the corresponding animation resource, and the resource processing content can specify specific processing content of the animation resource, and thus efficient management of the animation resource can be realized. Based on environmental configuration information of the target project, a software initiating terminal can automatically initiate the target project in the environmental configuration information; and after initiation, the corresponding animation resource can be drawn according to the resource file information of the target resource. The connection between the management of the animation resource and the management of drawing is realized through the synergy of the environmental configuration information and the resource file information, and thus the efficient management of the animation resource is realized.

BRIEF DESCRIPTION OF THE DRAWINGS

In order to explain the embodiments of the present disclosure or the technical solutions in the prior art more clearly, the drawings that need to be used in the description of the embodiments or the prior art will be briefly introduced in the following. Obviously, the drawings in the following description are some embodiments of the present disclosure, and for those of ordinary skilled in the art, other drawings can be obtained according to these drawings without any creative effort.

FIG. 7 is a flowchart of another embodiment of an information processing method for an animation resource according to an embodiment of the present disclosure.

FIG. 8 is a structural schematic diagram of an embodiment of an information processing apparatus for an animation resource according to an embodiment of the present disclosure.

DESCRIPTION OF EMBODIMENTS

Figure 1:
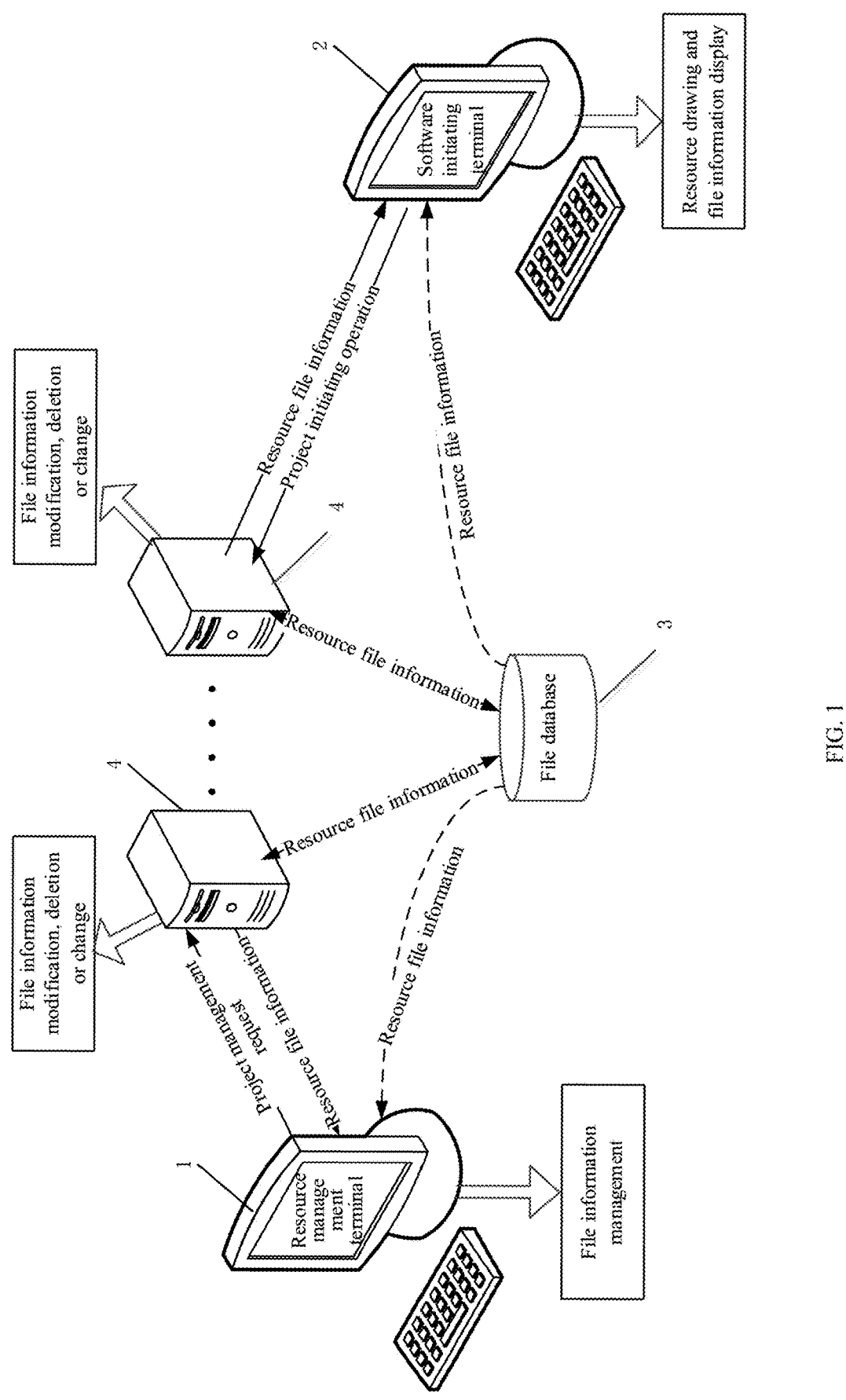
FIG. 1 is a network architecture diagram of an information processing system for an animation resource according to an embodiment of the present disclosure.

In order to make the objectives, technical solutions and advantages of the embodiments of the present disclosure clearer, the technical solutions in the embodiments of the present disclosure will be described clearly and comprehensively with reference to the drawings in the embodiments of the present disclosure. Obviously, the described embodiments are part of the embodiments of the present disclosure, rather than all of the embodiments. Based on the embodiments in the present disclosure, all the other embodiments obtained by those of ordinary skill in the art without creative efforts should fall into the protection scope of the present disclosure.

The technical solutions of the present disclosure can be applied to the management scenario for an animation resource. By creating resource file information for the animation resource and managing it in a unified way, the animation resource of a project can be effectively managed, and thus the management efficiency of the animation resource can be improved.

In related technologies, an animation resource, as an important resource of a large-scale development project, has a strong influence on the development and management of the project. In practical applications, a project may contain multiple animation resources. For example, a general project has hundreds of animation resources, and thus efficient management of the project resources is a technical problem that needs to be solved urgently. The management of animation resources of a project is usually done manually, and the animation resources of the project are counted manually, but this management method is inefficient.

In order to solve the above technical problem, in the present disclosure, resource file information is considered to be created for an animation resource, and through the resource file information, the animation resource can be viewed, managed and so on. The resource of the project can be effectively managed using the resource file information of the animation resource, thus the efficiency of resource management is improved and the cost of resource management is reduced.

In the embodiments of the present disclosure, an information processing method for an animation resource is provided. The method allows for detecting, at a resource management terminal, a project management request initiated by a first user for a target project, and then displaying resource file information corresponding to an animation resource of the target project in response to the project management request, where the resource file information is determined based on environmental configuration information of the target project. The resource file information can record attribute information of the animation resource, such as a resource name, a type, creation time and other information. The animation of the target project can be managed more effectively through the resource file information, and by detecting a resource management operation performed by the first user for the resource file information, target file information obtained after execution of the resource management operation can be obtained. By operating the resource file information of the animation resource, file content of the animation resource can be managed, and thus accurate management of the animation resource can be realized. The target file information can be used to record resource processing content of the corresponding animation resource, and the resource processing content can specify the specific processing content of the animation resource, and thus the efficient management of the animation resource can be realized. Based on environmental configuration information of the target project, a software initiating terminal can automatically initiate the target project in the environmental configuration information; and after initiation, the corresponding animation resources can be drawn according to the resource file information of the target resource. The connection between the management of the animation resource and the management of drawing is realized through the synergy of the environmental configuration information and the resource file information, and thus the efficient management of the animation resource is realized.

The technical solutions of the present disclosure and how the technical solutions of the present disclosure solve the above technical problem will be described in detail with specific embodiments. The following specific embodiments can be combined with each other, and the same or similar concepts or processes may not be repeated in some embodiments. The embodiments of the present disclosure will be described in detail below with reference to the drawings.

FIG. 1 is a network architecture diagram of an information processing system for an animation resource according to an embodiment of the present disclosure, and the information processing system for the animation resource may include a resource management terminal 1 and a software initiating terminal 2. The software initiating terminal can be installed with an animation drawing program.

The resource management terminal 1 can be configured for: detecting a project management request initiated by a first user for a target project; displaying resource file information corresponding to an animation resource of the target project in response to the project management request; detecting a resource management operation performed by the first user for the resource file information, and determining target file information obtained after execution of the resource management operation; where the target file information is configured to record resource processing content corresponding to the animation resource of the target project.

The software initiating terminal 2 can be configured for: acquiring target file information of a target project in response to a project initiating operation performed by a third user for the target project, where the target file information is obtained after execution of a resource management operation by a first user for resource file information of the target project; determining environmental configuration information of the target project by using the target file information; controlling an animation drawing program to initiate the target project, based on the environmental configuration information, where the animation drawing program is configured to draw a corresponding animation resource according to the target file information of the target project, and the target file information is configured to record resource processing content corresponding to the animation resource of the target project.

The resource management terminal 1 and the software initiating terminal 2 can be respectively configured in an electronic device. In practical applications, the resource management terminal 1 and the software initiating terminal 2 may also have a communication connection with a file database 3 to read resource file information from the file database 3. The management efficiency of the animation resource can be improved by reading the resource file information.

In addition, in order to ensure the security of the resource file information in the file database 3, in practical applications, an intermediate server 4 can be added for the communication between the file database 3 and the resource management terminal 1 and between the file database 3 and the software initiating terminal 2. At this time, a processing operation by the resource management terminal 1 or the software initiating terminal 2 on the resource file information in the file database 3 can be performed in the intermediate server 4 to isolate the storage and processing of data and ensure the security of the file database 3.

Figure 2:
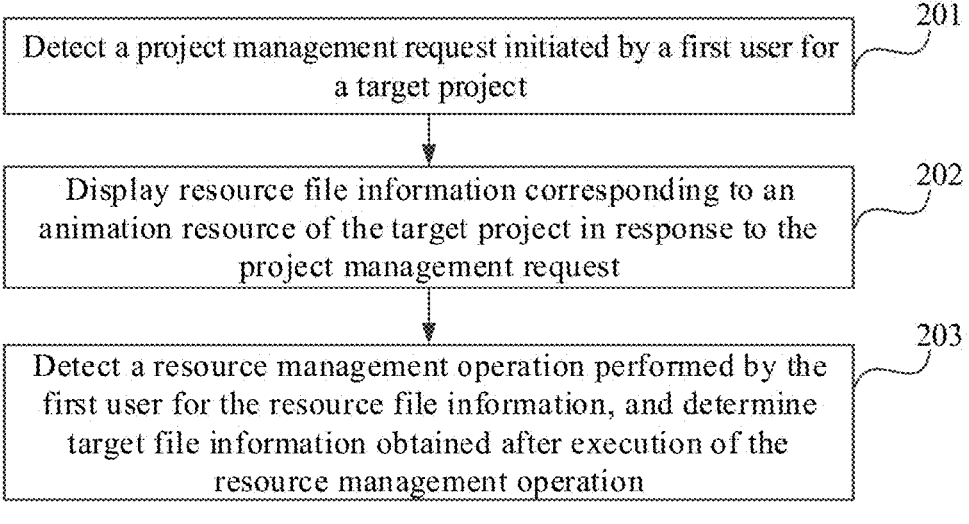
FIG. 2 is a flowchart of an embodiment of an information processing method for an animation resource according to an embodiment of the present disclosure.

FIG. 2 is a flowchart of an embodiment of an information processing method for an animation resource according to an embodiment of the present disclosure. The information processing method for the animation resource may be configured with an information processing apparatus, which may be packaged as a resource management terminal. The information processing apparatus is located in an electronic device. The information processing method for the animation resource can include the following steps.

201: detecting a project management request initiated by a first user for a target project.

The project management request may refer to a project opening request sent by the first user for a first project.

Detecting the project management request initiated by the first user for the target project can include: detecting the target project selected by the user from a project list control, and detecting a project opening control triggered by the user to acquire the project management request initiated by the first user for the target project. Project names of a plurality of projects can be displayed in the project list control. When a user clicks a control corresponding to any project name, a project that the project name refers to is the target project. A control name of the project opening control can prompt to load the target project. For example, the control name of the project opening control can include Load Project List.

The first user may be a user who can manage the target project, such as a project manager or the like. Before the first user initiates the project management request for the target project, the method may further include: acquiring user login information provided by the first user, where when the user login information of the first user is successfully verified, it may be determined that the first user can initiate the project management request for the target project.

The project management request may include a project identifier of the target project, and the initiated target project can be identified by the project identifier to obtain resource file information of the target project.

202: displaying resource file information corresponding to an animation resource of the target project in response to the project management request.

The animation resource of the target project can be stored in a resource server, and the resource file information corresponding to the animation resource can be stored in the file database. That is, the animation resource and the resource file information of the target project can be stored separately, so that the resource and file information of the target project can be managed separately, and thus the resource management efficiency of the target project can be improved.

The resource file information can include a resource storage address and a resource name of the animation resource. The resource storage address can be quickly located to the corresponding resource storage location. In a possible design, the resource file information may include a packet name of a resource packet in which the animation resource is located. For example, "A" file information may include five animation resources: "a1, a2, a3, a4 and a5". One or more pieces of resource file information may be included. One piece of resource file information may correspond to one or more animation resources, and one or more animation resources corresponding to one piece of resource file information may be displayed by the network access address(es) of the animation resource(s). For example, when "A" file information is selected, network access addresses of five animation resources such as a1-a5 may be displayed.

203: detecting a resource management operation performed by the first user for the resource file information, and determining target file information obtained after execution of the resource management operation.

The target file information is configured to record resource processing content corresponding to the animation resource of the target project.

The resource management operation may refer to a corresponding management operation performed on the animation resource corresponding to the resource file information. Each resource management operation may perform a corresponding operation, such as addition, modification or deletion of information content, on the corresponding resource file information to obtain target file information. The target file information can be obtained by performing the resource management operation on the resource file information.

In embodiments of the present disclosure, a first user can initiate a project management request for a target project. Resource file information corresponding to an animation resource of the target project is displayed in response to the project management request. The resource file information can record attribute information of the animation resource, such as a resource name, a type, creation time and other information. The animation of the target project can be managed more effectively through the resource file information, and by means of detecting a resource management operation performed by the first user for the resource file information, target file information obtained after execution of the resource management operation can be obtained. By operating the resource file information of the animation resource, file content of the animation resource can be managed, and thus accurate management of the animation resource can be realized. The target file information can be used to record resource processing content of the corresponding animation resource, and the resource processing content can specify specific processing content of the animation resource, and thus efficient management of the animation resource can be realized.

Figure 3:
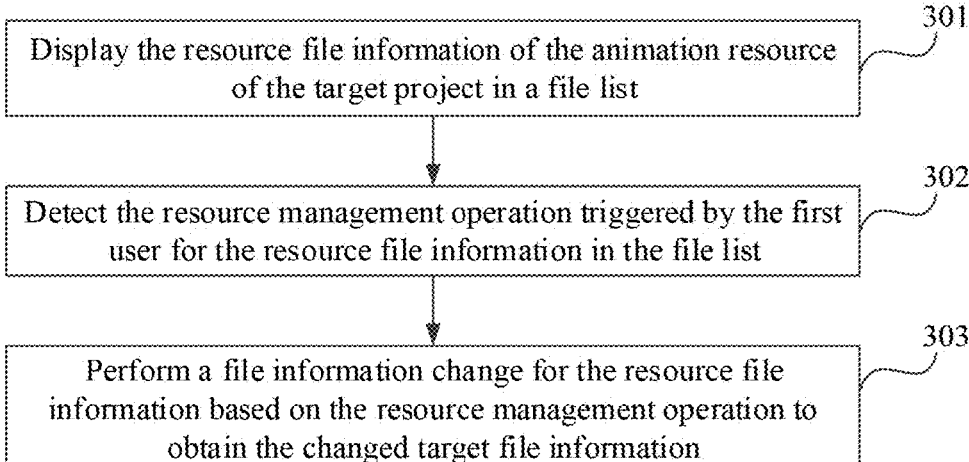
FIG. 3 is a flowchart of another embodiment of an information processing method for an animation resource according to an embodiment of the present disclosure.

Upon managing the resource file information, in order to improve the operation efficiency, the resource file information can be displayed in the form of a list. FIG. 3 is a flowchart of another embodiment of an information processing method for an animation resource according to an embodiment of the present disclosure, where the difference from the embodiment shown in FIG. 2 lies in that step 203, i.e., detecting the resource management operation performed by the first user for the resource file information and determining the target file information obtained after execution of the resource management operation, may include the following steps.

301: displaying the resource file information of the animation resource of the target project in a file list.

In an embodiment, the file list can display a plurality pieces of resource file information in the form of a list, and each piece of resource file information can be a row in the list.

Figure 4:
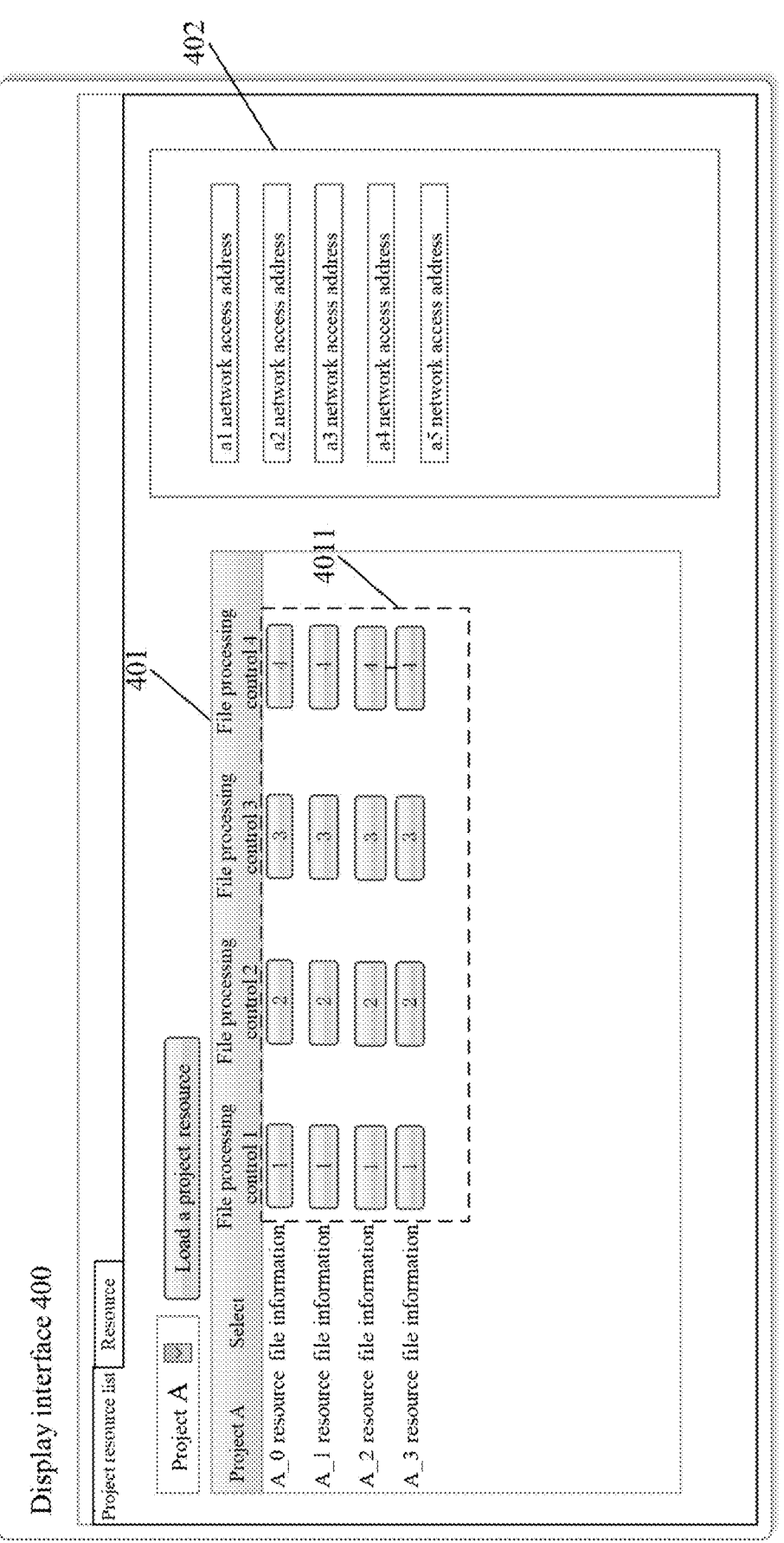
FIG. 4 is an exemplary diagram of a display interface of resource file information according to an embodiment of the present disclosure.

In a possible design, the file list can be a display list of the resource file information in a display interface of the resource file information. For ease of understanding, the display interface 400 of the resource file information as shown in FIG. 4 may include a file list area 401 corresponding to the resource file information of project A. Referring to FIG. 4, it is assumed that the resource file information of project A may include resource file information such as A_0, A_1, A_2 and A_3. In addition, in practical applications, the display interface 400 may include a resource list area 402 of the animation resource corresponding to the resource file information in addition to the file list area 401. The resource list area 402 shows network access addresses of animation resources a1-a5 corresponding to the A_0 resource file information. In addition, in order to improve the management efficiency of the resource file information, a file processing control can be associated with the resource file information. The file list area 401 as shown in FIG. 4 may also include a display area 4011 of the file processing control. Of course, each piece of resource file information can be associated with a file processing control.

302: detecting the resource management operation triggered by the first user for the resource file information in the file list.

In an embodiment, the resource management operation may be a resource operation command executed on the resource file information. One piece of resource file information may correspond to a plurality of resource management operations.

303: performing a file information change for the resource file information based on the resource management operation to obtain the changed target file information.

The resource management operation can be associated with an information processing instruction of the resource file information in advance. The performing the file information change for the resource file information based on the resource management operation to obtain the changed target file information may include: based on the information processing instruction corresponding to the resource management operation, possibly performing a corresponding file information change for the resource file information according to the information processing instruction to obtain the changed target file information.

The resource management operation may specifically refer to resource distribution, resource disposal or other management operation. Of course, in practical applications, the resource management operation may also include resource deletion, addition, change or other management operation.

In embodiments of the present disclosure, the resource file information of the animation resource of the target project can be displayed one by one through the file list, and thus the efficient display of the resource file information can be realized. Meanwhile, the first user can perform a resource management operation on the resource file information in the file list, and can detect the resource management operation triggered by the first user for the resource file information in the file list. A file information change can be performed on the resource file information through the resource management operation, and the changed target file information can be obtained. Through the file list, the resource file information can be displayed efficiently, and a corresponding resource management operation can be executed quickly, thus improving the processing efficiency of the resource file information.

In order to improve the operation efficiency of the resource file information, in a possible design, step 302, i.e., detecting the resource management operation triggered by the first user for the resource file information in the file list, may include:

displaying, for the resource file information, a file processing control associated therewith in the file list; and detecting a control triggering operation performed by the first user for the file processing control of the resource file information to detect the resource management operation.

Step 303, i.e., performing a file information change for the resource file information based on the resource management operation, to obtain the changed target file information, may include:

determining, based on the control triggering operation, a corresponding file processing instruction of the control triggering operation; and running the file processing instruction to perform corresponding file information change processing for the resource file information so as to obtain the changed target file information.

The resource management operation can be obtained by a user triggering the file processing control. Any resource file information can be associated with a file processing control. The file processing control associated with the resource file information may be at least one in number.

In embodiments of the present disclosure, by setting the file processing control for the resource file information in the file list, one-click management of the resource file information can be realized, and thus the file management efficiency can be improved.

In practical applications, the file processing control includes at least one of the following controls: a file creation control, a map setting control, a resource cutting control, a display repair control and a resource packaging control.

Among them, the file creation control (Gen Folders) can be used for all files and folders involved in creating an animation asset on nas, which may include an empty file for occupation; and each file can be named according to the file naming strategy.

The map setting control (Gen Tex Lod) can be used to automatically generate the level of details (LOD) of the mapping (an animation resource) directly in the background, and the generation process can be displayed in the resource list located on the right side of the interface, such as the resource list area 402 as shown in FIG. 4.

The resource cutting control (Has Body Mask) can be used to provide a mapping instruction of outline cutting map for an animation resource corresponding to asset file information. When the resource cutting control is set, it is necessary to add a black and white outline cutting map for the animation resource.

The display repair control (Fix Tex Res) can be used to automatically repair a resolution of the map that meets the 2K resolution, specifically, the map that does not meet the 2K resolution can be stored in the 2K folder, and the resolution thereof can be automatically repaired.

The resource packaging control (Pack It) can be used to automatically package the animation resource corresponding to the resource file information. For example, the animation resource is automatically packaged and stored in the target folder, so that the standardized folder structure and naming can be directly sent to other users.

Of course, in practical applications, the file processing control can also include controls with other resource processing functions, which can be set according to actual usage requirements. The file processing control shown in this embodiment is only schematic, and should not constitute a detailed limitation on the technical solutions of the present disclosure.

In embodiments of the present disclosure, by setting different file processing controls according to different processing functions, control definitions can be realized for the processing of the resource file information, targeted control settings can be realized, and thus targeted management of the resource file information can be obtained.

In some embodiments, the target project may be pre-created. As an embodiment, the method may further include: creating the resource file information corresponding to the target project in response to a project creating request triggered by a second user.

The creating the resource file information corresponding to the target project in response to the project creating request triggered by the second user may include: outputting the file information to a project content input page for the second user in response to the project creating request triggered by the second user; detecting an input operation of the second user on the project content input page, and obtaining project information of the target project; and creating the resource file information corresponding to the target project based on the project information of the target project. The project information can include: a project name, a project file name, a project file path and other information. The resource file information corresponding to the project information can be automatically created according to the project information.

In embodiments of the present disclosure, the resource file information corresponding to the target project can be created in response to the project creating request triggered by the second user, and the creation of the target project and the resource file information can be realized through the configuration of the resource file information, thus realizing the efficient management of the project.

Figure 5:
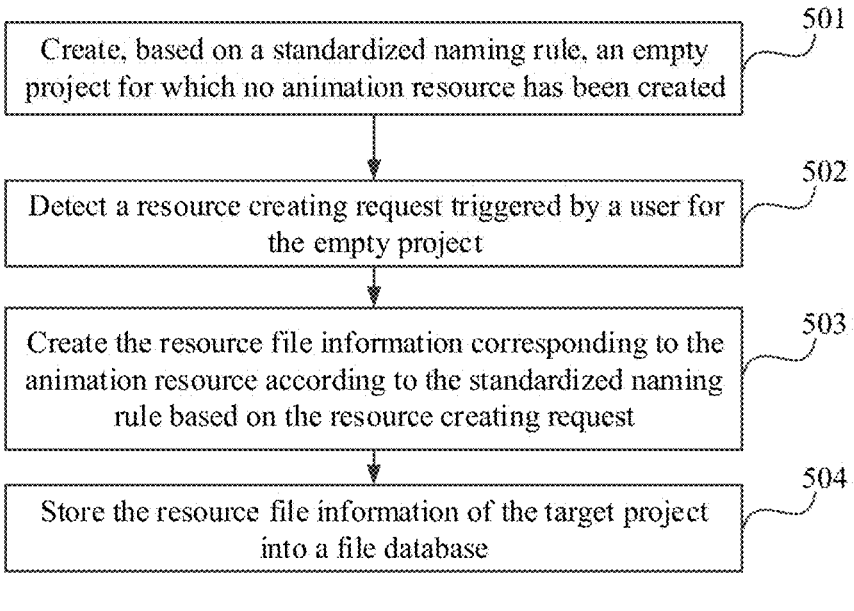
FIG. 5 is a flowchart of another embodiment of an information processing method for an animation resource according to an embodiment of the present disclosure.

FIG. 5 is a flowchart of another embodiment of an information processing method for an animation resource according to an embodiment of the present disclosure, where the difference from the embodiment shown in FIG. 2 or FIG. 3 lies in that the creating the resource file information corresponding to the target project in response to the project creating request triggered by the second user may include:

501: creating, based on a standardized naming rule, an empty project for which no animation resource has been created;

502: detecting a resource creating request triggered by a user for the empty project;

503: creating the resource file information corresponding to the animation resource according to the standardized naming rule based on the resource creating request; and 504: storing the resource file information of the target project into a file database.

The standardized naming rule can mean that the same prefix is used in the same project, i.e., there is a same prefix for the resource name of the animation resource in a same project. For example, when "A_" is used as the prefix of the resource name of the animation resource of the same project, there may be two mapping resources, respectively A_Geo and A_Shape.

The creating, based on the standardized naming rule, the empty project for which no animation resource has been created may include: outputting an input page of the project name; detecting the project name input by a user on the project name input page; and generating an empty project named by the project name if it is determined that the project name conforms to the standardized naming rule, where the empty project is empty of animation resources.

After the empty project is created, the resource creating request triggered by the user can be detected. The detecting the resource creating request triggered by the user for the empty project may include: displaying a file create page of the animation resource for the user based on the resource creating request; and detecting the file information of the animation resource input by the user in the file creation page, where the file information may include a file name, and if it is determined that the file name meets the standardized naming rule, the resource file information corresponding to the animation resource can be created using the file name. Whether the file name meets the standardized naming rule may mean that the file name is the same as the preset project prefix.

The file database is a database for storing resource file information of a project, and the resource file information of each project can be stored in the database in the form of a tree-like structure.

In embodiments of the present disclosure, upon creating the target project, an empty project for which no animation resource has been created can be created based on the standardized naming rule, and a resource creating request sent by the user for the empty project can be detected, so that the resource file information corresponding to the animation resource can be created according to the standardized naming rule based on the resource creating request, and the management of the animation resource can be completed through the resource file information. Therefore, the target creating resource of the resource file information is created, thereby improving the efficiency of resource creation.

In some embodiments, before the displaying the resource file information corresponding to the animation resource of the target project in response to the project management request, the information processing method further includes: determining a file database of the target project; and determining, from the file database, the resource file information of the animation resource in the target project.

The file database can store resource file information of each project. In practical applications, the project name or the project identifier of the project can be read in association with the resource file information, for example, the project name or the project identifier can be used as the information name of the resource file information, and the like.

The file database may include a MongoDB database (a database based on distributed file storage). The MongoDB database can record resource file information related to an animation asset of the project, and the resource file information can be stored in the MongoDB database in the form of a data table. The resource file information can include a plurality of forms in the data table, and all forms can be associated by a keyword. The keyword may refer to a prefix set for the project, and a file of each animation resource can be named by this prefix.

In order to complete the search of the resource file information conveniently, by associating all forms of the animation resource via the prefix, the file information of the corresponding animation resource can be found through forward query or reverse query. In practical applications, the resource file information may include at least one of the following table types: a project management table, an asset table, a shot table, a task table, a personnel management table, a release information table, etc. Among them, the project management table can be used to store the project information of all target projects recorded in the database. The asset table can be resource information of all animation resources contained in a target project. The shot table can be shot information corresponding to a shot which is used to make an animation resource in a target project. The task table can be task production information related to all shots and all animation assets in a target project, where a stored task can be assigned to a corresponding asset producer by means of querying the task table. The personnel management table can include a list of information of all asset producers managed in a management platform. The release information table can include a list of resource version information completed and submitted by an asset producer after completing an asset production task.

The resource file information can include a variety of table types, which are used to record different types of information, and can facilitate the query of information.

In embodiments of the present disclosure, upon acquiring the resource file information, a file database of the target project can be determined, and the resource file information of the animation resource of the target project can be read from the file database. The file database can store the resource file information of the animation resource, which can ensure the security and stability of the resource file information.

As a possible implementation, the determining, from the file database, the resource file information of the animation resource in the target project may include:

> determining an intermediate server configured to perform a file information change;

> sending a reading request for the resource file information of the target project to the intermediate server, where the reading request is indicative of reading the resource file information from the file database by the intermediate server; and > receiving the resource file information of the animation resource in the target project fed back by the intermediate server.

In an embodiment, the intermediate server may include a WEB (World Wide Web) server, and a WEB server for intermediate access of the resource file information may be established through a virtual machine. Through the establishment of the WEB server, the processing of the resource file information of the database can be completed in the WEB server to ensure the security of the database.

In an embodiment, the sending the reading request for the resource file information of the target project to the intermediate server may include: acquiring an access interface (API, Application Programming Interface) provided by the intermediate server, and transmitting the reading request for the resource file information of the target project to the access interface. When the access interface of the intermediate server receives the reading request, the reading request can be re-encapsulated to obtain a network access address for the resource file information of the target project of the file database, and the network access address is also a URL (Uniform Resource Locator). The resource file information of the target project can be read from the file database by operating the file database through the network access address of the resource file information. The URL can be obtained by encapsulating the reading request for the resource file information of the target project according to the definition of the URL. Python programming language can be used to complete the interface encapsulation of the intermediate server and the program processing of the URL conversion module.

In embodiments of the present disclosure, by setting up an intermediate server between a user terminal and the file database, the processing operation of the resource file information can be completed in the intermediate server, which can realize an access isolation for the user terminal and the file database and ensure the security of the file database.

In some embodiments, detecting the resource management operation performed by the first user for the resource file information, and determining the target file information obtained after execution of the resource management operation may include:

> detecting the resource management operation performed by the first user for the resource file information;

> generating a corresponding file content changing request based on the resource management operation;

> sending the file content changing request to the intermediate server, where the file content changing request is indicative of changing, by the intermediate server, the resource file information into the target file information according to the file content changing request; and > receiving the target file information fed back by the intermediate server.

After obtaining the resource file information of the target project, the resource file information of the target project can be output, and the resource management page of the resource file information can be displayed. The detecting the resource management operation performed by the first user for the resource file information may include: detecting the resource management operation performed by the first user on the resource file information through the resource management page. The resource management page can include operations such as the first user triggering a resource management control, a resource management button for the resource file information. The resource management operation performed by the first user for the resource file information can be accurately acquired through the resource management page. The resource management control can include, for example, at least one of the following operations: addition, modification and deletion of the resource file information.

The resource management operation can be used to determine content of a specific operation to be performed on the resource file information. The resource management operation may include the first user triggering a resource management control or a resource management button in the resource management page, and the content of the corresponding operation can be determined according to the triggered resource management control or resource management button. The corresponding file content changing request can be generated according to the operation content corresponding to the resource management operation.

In an embodiment, after the content changing request is sent to the intermediate server, the intermediate server can operate the resource file information according to the operation content in the content changing request to obtain the target file information after the operation.

After the intermediate server obtains the target file information, the target file information can be sent to the file database to update the original resource file information in the file database as the target file information.

In embodiments of the present disclosure, an intermediate server can be set between the resource management terminal and the file database, and by detecting the resource management operation performed by the first user for the resource file information, the content changing request corresponding to the resource management operation is sent to the intermediate server, and the resource file information can be changed into the target file information by the intermediate server according to the file content changing request. The file content changing request can be indicative of changing, by the intermediate server, the resource file information into the target file information according to the file content changing request. Through the interaction with the intermediate server, the change of the file resource can be completed, so that the change of the file resource is not directly done for the database, isolating the database from the processing of the resource file information to ensure the security of the file database.

Figure 6:
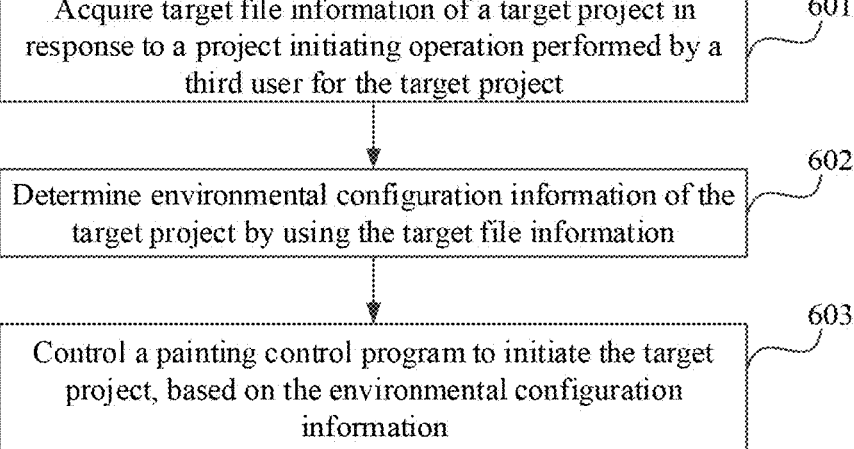
FIG. 6 is a flowchart of another embodiment of an information processing method for an animation resource according to an embodiment of the present disclosure.

FIG. 6 is an information processing method for an animation resource according to an embodiment of the present disclosure, where the information processing method for the animation resource can be configured with an information processing apparatus for an animation resource, which can be packaged as a software initiating terminal. An animation drawing program can be installed in the software initiating terminal. The information processing apparatus for the animation resource can be located in an electronic device, where the information processing method for the animation resource can include the following steps.

601: acquiring target file information of a target project in response to a project initiating operation performed by a third user for the target project.

The target file information is obtained after execution of a resource management operation by a first user for resource file information of the target project.

The target file information can include a project name of the target project and a location of the third user. The location of the third user can be used to determine an intermediate server that matches the location. The intermediate server can be a distributed server, and distributed servers can be set in different locations or regions. Upon determining the location of the third user, a server with the smallest distance from the location can be determined from the distributed servers as the intermediate server of the third user.

The acquiring the target file information of the target project can include: acquiring the target file information of the target project according to the project name of the target project and a network access address of the target project.

602: determining environmental configuration information of the target project by using the target file information.

The environmental configuration information can be created and stored in advance. The determining the environmental configuration information of the target project by using the target file information may include: reading the corresponding environmental configuration information according to the file name, based on the file name of the target file information.

In an embodiment, the animation drawing program is used to draw the corresponding animation resource according to the resource file information of the target project.

603: controlling an animation drawing program to initiate the target project, based on the environmental configuration information. The animation drawing program is used to draw the corresponding animation resource according to the target file information of the target project. The target file information is configured to record resource processing content corresponding to the animation resource of the target project.

In embodiments of the present disclosure, target file information of a target project can be acquired in response to a project initiating operation performed by a third user for the target project. Environmental configuration information of the target project can be determined using the target file information. The environmental configuration information can control the animation drawing program to initiate the target project. The animation drawing program may be used to draw the corresponding animation resource according to the target file information of the target project. Through the environmental configuration information, the target project can be initiated automatically at the software initiating terminal. The target file information of the target project can be displayed through the initiation of the target project. The animation resource of the target project can be drawn according to the environmental configuration information through the target file information of the target project, thus completing the drawing of the animation resource of the target project and improving the processing efficiency of the animation resource.

As an embodiment, the determining the environmental configuration information of the target project by using the target file information may include:

determining, based on a standardized naming rule, an information name of the environmental configuration information that corresponds to a file name corresponding to the target file information; and creating the environmental configuration information corresponding to the information name.

The environmental configuration information can include a plug-in path, an environment variable, a project name, an access path of a file storage server and other information related to the initiating process of the target project. For the related content of the standardized naming rule, please refer to the description in the previous embodiments, which will not be repeated herein.

In embodiments of the present disclosure, the information name corresponding to the file name of the target file information can be determined through the standardized naming rule, so that the naming of the environmental configuration information also conforms to the standardized naming rule, the applicability of the environmental configuration information is enhanced, the accurate generation of the environmental configuration information is realized, and the usage accuracy of the environmental configuration information is higher.

In a possible design, the acquiring the target file information of the target project can include:

determining an intermediate server configured to perform a file information change;

sending a reading request for the target file information of the target project to the intermediate server, where the reading request is indicative of reading the target file information of the target project from the file database by the intermediate server; and receiving the target file information of the target project fed back by the intermediate server.

For the related description of the intermediate server, please refer to the previous embodiments, which will not be repeated herein.

In embodiments of the present disclosure, upon acquiring the target file information of the target project, the target file information of the target project can be read from the file database by the intermediate server, so that the reading of the target file information of the target project can be performed by the intermediate server, and the intermediate server is used to isolate the reading of the file information stored in the file database, thus avoiding direct access to the file database and ensuring the security of the file database.

FIG. 7 is an information processing method for an animation resource according to an embodiment of the present disclosure, where the information processing method for the animation resource can be configured with an information processing apparatus for an animation resource, which can be packaged as an animation drawing program. The animation drawing program can be installed in the software initiating terminal as shown in FIG. 1. The information processing apparatus for the animation resource can be located in an electronic device, where the information processing method for the animation resource can include the following steps.

701: detecting environmental configuration information provided by the software initiating terminal.

The software initiating terminal can send the environmental configuration information to the animation drawing program. The animation program can detect the environmental configuration information provided by the software initiating terminal.

702: parsing the environmental configuration information to determine a target project and target file information of the target project. The target file information is obtained after execution of a resource management operation by a first user for resource file information of the target project.

703: generating a project initiating instruction of the target project by using the target file information of the target project.

The project initiating instruction can be generated based on the target file information of the target project, and the project initiating instruction can be automatically generated by a preset programming language according to a writing rule of the initiating instruction. The project initiating instruction can include calling to relevant information in the environmental configuration information, for example, the project initiating instruction can include the utilization of a relevant plug-in, an environment variable and other information, so as to realize the accurate generation of the target project.

704: running the project initiating instruction, initiating the target project and displaying the target file information of the target project. The target file information is configured to record resource processing content corresponding to the animation resource of the target project.

The displaying the target file information of the target project may include: determining a display area of the file information in a display interface of the animation drawing program, and displaying the target file information in the display area.

In embodiments of the present disclosure, the painting drawing program can detect the environmental configuration information provided by the software initiating terminal to parse the environmental configuration information, so as to determine the target project and the target file information of the target project. Upon determining the target project, the target file information can be used to generate the project initiating instruction of the target project. The project initiating instruction can control the painting program to load the target project according to the environmental configuration information, and display the target file information of the animation resource. The target file information can be used to automatically generate the project initiating instruction of the target project, which can realize the automatic initiation of the target project. At the same time, the setting of the environmental configuration information can make the initiating environment of the target project consistent with the initiating requirement of the project itself, thus realizing the rapid and accurate initiation of the target project.

In a possible design, after the initiating the target project and displaying the target file information of the target project, the method may further include:

detecting an animation resource drawn by a fourth user based on the resource processing content recorded in the target file information.

The fourth user can be a user who draws the animation resource. In practical applications, the fourth user can be the same user as the third user. The first, second, third, fourth, etc. involved in the embodiments of the present disclosure are used to distinguish different users by name and realize the distinction of users who perform different operations, but do not have actual user identity distinction, nor do they have mathematical meanings such as sorting and size.

The fourth user, when clicking any target file information, can view the resource processing content of the target file information, so as to draw the corresponding animation resource according to the resource processing content. The format of the animation resource can be determined according to the resource processing content, for example, the format of the animation resource can include formats such as a video, an image, a mathematical model, etc. The specific format of the animation resource is not too limited in the embodiments of the present disclosure.

In embodiments of the present disclosure, the fourth user can draw the corresponding animation resource according to the target file information through the display of the target file information, thus realizing the accurate display of the animation resource, and improving the drawing efficiency of the animation resource.

In some embodiments, after the detecting the animation resource drawn by the fourth user based on the resource processing content recorded in the target file information, the information processing method further includes:

detecting a resource export request triggered by the fourth user for the animation resource, and determining a resource name of the animation resource; and if it is determined that the resource name meets a standardized naming rule, generating target resource data corresponding to the animation resource according to the resource name, and storing the target resource data into a data memory according to a predetermined storage path.

In an embodiment, the resource name of the animation resource can be read from the target file information corresponding to the animation resource. The storage path over which the target resource data is stored may include a storage path recorded in the target file information corresponding to the animation resource.

For ease of understanding, using a digital human resource as an example of the animation resource, a resource export control can be displayed for a user. For example, the resource export control can include one or more of: a thumbnail generation control, an image export control, etc. The resource export control can correspond to a corresponding export model. Upon a detection that the user triggers the resource export control, it can be determined that the user triggers a resource export request for an animation resource of a digital human, so as to determine the resource name of the animation resource. Determining the resource name of the animation resource may include: detecting the resource name input by the user for the name input control of the animation resource. The name input control may include a text input control.

After determining the resource name of the animation resource, whether the resource name meets the standardized naming rule can be confirmed. The standardized naming rule has been introduced in the previous embodiments, which will not be repeated herein.

In embodiments of the present disclosure, the resource export request triggered by the fourth user for the animation resource can be detected, and the naming window of the animation resource can be displayed to obtain the resource name input by the fourth user in the naming window. Upon determining that the resource name is named based on the preset standardized naming rule, the target resource data corresponding to the animation resource can be generated according to the resource name. The resource file information of the animation resource can conform to the naming rule by naming according to the standardized naming rule. The standardized naming rule can ensure the resource stability of the animation resource.

As yet another embodiment, the parsing the environmental configuration information to determine the target project and the target file information of the target project includes:

parsing the environmental configuration information to determine the target project and a network access address of the acquired target file information and an intermediate server;

sending a reading request for the target file information of the target project to the intermediate server, where the reading request is indicative of reading the target file information of the target project from the file database by the intermediate server; and receiving the target file information of the target project fed back by the intermediate server.

The network access address of the target file information and the intermediate server can be directly or indirectly determined based on the environmental configuration information. For example, the network access address can be directly parsed from the environmental configuration information, and for the intermediate server, a server with the minimum distance can be determined from the distributed servers through locations in the environmental configuration information. The minimum distance can mean a minimum network distance or a minimum physical distance.

In embodiments of the present disclosure, upon acquiring the target file information of the target project, the target file information of the target project can be read from the file database by the intermediate server, so that the reading of the target file information of the target project can be performed by the intermediate server, and the intermediate server is used to isolate the reading of the file information stored in the file database, thus avoiding direct access to the file database and ensuring the security of the file database.

FIG. 8 is a structural schematic diagram of an embodiment of an information processing apparatus 800 for an animation resource according to an embodiment of the present disclosure, where the information processing apparatus 800 for the animation resource may be located in an electronic device, and the information processing apparatus 800 for the animation resource may include the following units:

a request detection unit 801, configured to detect a project management request initiated by a first user for a target project;

a request response unit 802, configured to display resource file information corresponding to an animation resource of the target project in response to the project management request; and a file adjustment unit 803, configured to detect a resource management operation performed by the first user for the resource file information, and determine target file information obtained after execution of the resource management operation.

The target file information is configured to record resource processing content corresponding to the animation resource of the target project.

As an embodiment, the file adjustment unit includes:

a resource display module, configured to display the resource file information of the animation resource of the target project in a file list;

a resource management module, configured to detect the resource management operation triggered by the first user for the resource file information in the file list; and a file changing module, configured to perform a file information change for the resource file information based on the resource management operation, to obtain the changed target file information.

In a possible design, the resource management module includes:

a control display submodule, configured to display, for the resource file information, a file processing control associated therewith in the file list; and an operation detection submodule, configured to detect a control triggering operation performed by the first user for the file processing control of the resource file information, to detect the resource management operation;

the file changing module can include:

an instruction determination submodule, configured to determine, based on the control triggering operation, a corresponding file processing instruction of the control triggering operation; and an instruction running submodule, configured to run the file processing instruction to perform corresponding file information change processing for the resource file information, so as to obtain the changed target file information.

In a possible design, the file processing control includes at least one of the following controls: a file creation control, a map setting control, a resource cutting control, a display repair control and a resource packaging control.

As yet another embodiment, the information processing apparatus 800 may further include:

a project creating unit, configured to create the resource file information corresponding to the target project in response to a project creating request triggered by a second user.

In a possible design, the project creating unit includes:

a first creating module, configured to create, based on a standardized naming rule, an empty project for which no animation resource has been created;

a request detection module, configured to detect a resource creating request triggered by a user for the empty project; and a resource creating module, configured to create the resource file information corresponding to the animation resource according to the standardized naming rule based on the resource creating request;

the information processing apparatus 800 may further include:

a file storage module, configured to store the resource file information of the target project into a file database.

In a possible design, the information processing apparatus 800 may further include:

a data determination unit, configured to determine a file database for storing the file resource of the target project; and a file reading unit, configured to determine, from the file database, the resource file information of the animation resource in the target project.

In a possible design, the file reading unit may include:

an intermediate determination module, configured to determine an intermediate server configured to perform a file information change;

a first sending module, configured to send a reading request for the resource file information of the target project to the intermediate server, where the reading request is indicative reading the resource file information from the file database by the intermediate server; and a first receiving module, configured to receive the resource file information of the animation resource in the target project fed back by the intermediate server.

In some embodiments, the file adjustment unit may include:

an operation detection module, configured to detect the resource management operation performed by the first user for the resource file information;

a change request module, configured to generate a corresponding file content changing request based on the resource management operation;

a second sending module, configured to send the file content changing request to the intermediate server, where the file content changing request is indicative of changing, by the intermediate server, the resource file information into the target file information according to the file content changing request; and a second receiving module, configured to receive the target file information fed back by the intermediate server.

Figure 9:
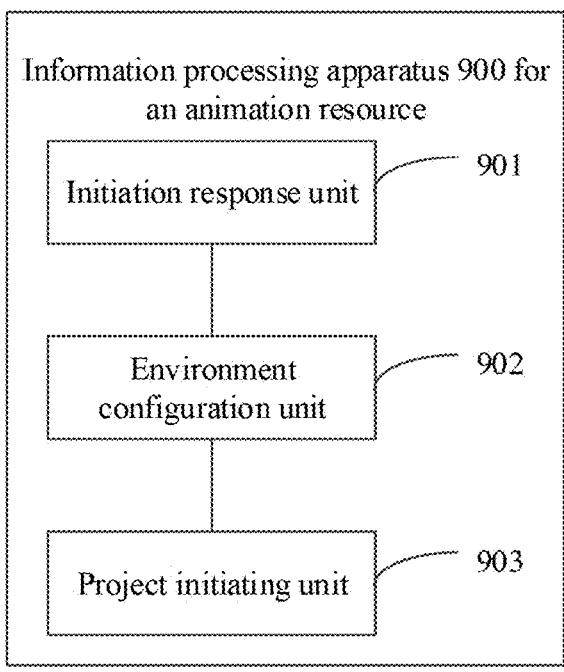
FIG. 9 is a structural schematic diagram of another embodiment of an information processing apparatus for an animation resource according to an embodiment of the present disclosure.

FIG. 9 is a structural schematic diagram of an embodiment of an information processing apparatus 900 for an animation resource according to an embodiment of the present disclosure, where the information processing apparatus 900 for the animation resource may be located in an electronic device, and the information processing apparatus 900 for the animation resource may include the following units:

an initiation response unit 901, configured to acquire target file information of a target project in response to a project initiating operation performed by a third user for the target project, where the target file information is obtained after execution of a resource management operation by a first user for resource file information of the target project;

an environment configuration unit 902, configured to determine environmental configuration information of the target project by using the target file information; and a project initiating unit 903, configured to control an animation drawing program to initiate the target project, based on the environmental configuration information, where the animation drawing program is configured to draw a corresponding animation resource according to the target file information of the target project, and the target file information is configured to record resource processing content corresponding to the animation resource of the target project.

As an embodiment, the environment configuration unit may include:

a name determination module, configured to determine, based on a standardized naming rule, an information name of the environmental configuration information that corresponds to a file name corresponding to the target file information; and a configuration creating module, configured to create the environmental configuration information corresponding to the information name.

In some embodiments, the initiation response unit includes:

an intermediate determination module, configured to determine an intermediate server configured to perform a file information change;

a third sending module, configured to send a reading request for the target file information of the target project to the intermediate server, where the reading request is indicative of reading the target file information of the target project from the file database by the intermediate server; and a third receiving module, configured to receive the target file information of the target project fed back by the intermediate server.

Figure 10:
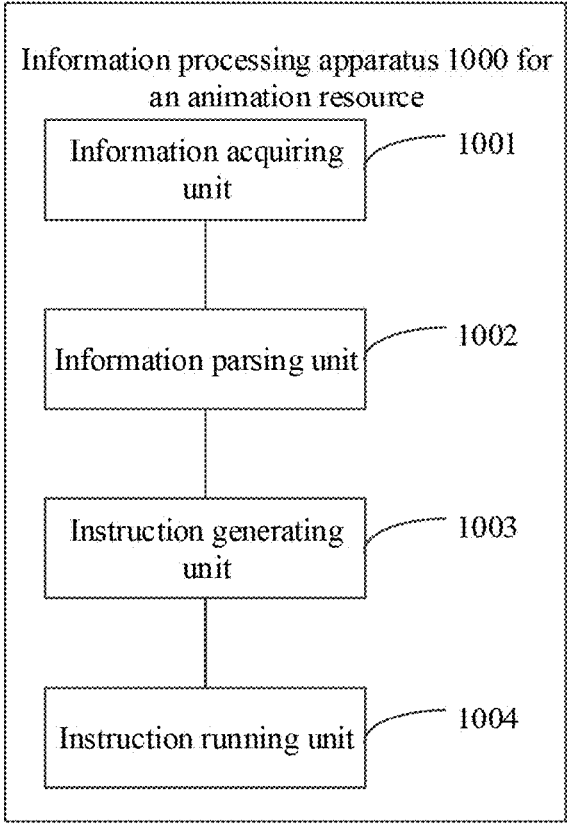
FIG. 10 is a structural schematic diagram of another embodiment of an information processing apparatus for an animation resource according to an embodiment of the present disclosure.

FIG. 10 is a structural schematic diagram of an embodiment of an information processing apparatus 1000 for an animation resource according to an embodiment of the present disclosure, where the information processing apparatus 1000 for the animation resource may be located in an electronic device, and the information processing apparatus 1000 for the animation resource may include the following units:

an information acquiring unit 1001, configured to detect environmental configuration information provided by a software initiating terminal;

an information parsing unit 1002, configured to parse the environmental configuration information to determine a target project and target file information of the target project, where the target file information is obtained after execution of a resource management operation by a first user for resource file information of the target project;

an instruction generating unit 1003, configured to generate a project initiating instruction of the target project by using the target file information of the target project; and an instruction running unit 1004, configured to run the project initiating instruction, initiate the target project and display the target file information of the target project, where the target file information is configured to record resource processing content corresponding to the animation resource of the target project.

In some embodiments, the information processing apparatus 1000 may further include:

a resource detection unit, configured to detect an animation resource drawn by a fourth user based on the resource processing content recorded in the target file information.

In a possible design, the information processing apparatus 1000 may further include:

a name determination unit, configured to detect a resource export request triggered by the fourth user for the animation resource, and determine a resource name of the animation resource; and a data generating unit, configured to generate target resource data corresponding to the animation resource according to the resource name and store the target resource data into a data memory according to a predetermined storage path, if it is determined that the resource name meets a standardized naming rule.

In some embodiments, the information processing apparatus 1000 further includes:

an intermediate determination unit, configured to determine an intermediate server configured to perform a file information change;

a first sending unit, configured to send a reading request for the target file information of the target project to the intermediate server, where the reading request is indicative of reading the target file information of the target project from the file database by the intermediate server; and a first receiving unit, configured to receive the target file information of the target project fed back by the intermediate server.

The information processing apparatus 1000 provided in this embodiment can be used to implement the technical solutions of the above method embodiments, and the implementation principle and technical effect thereof are similar, which will not be repeated here in this embodiment.

In order to realize the above embodiments, an embodiment of the present disclosure also provides an electronic device.

Figure 11:
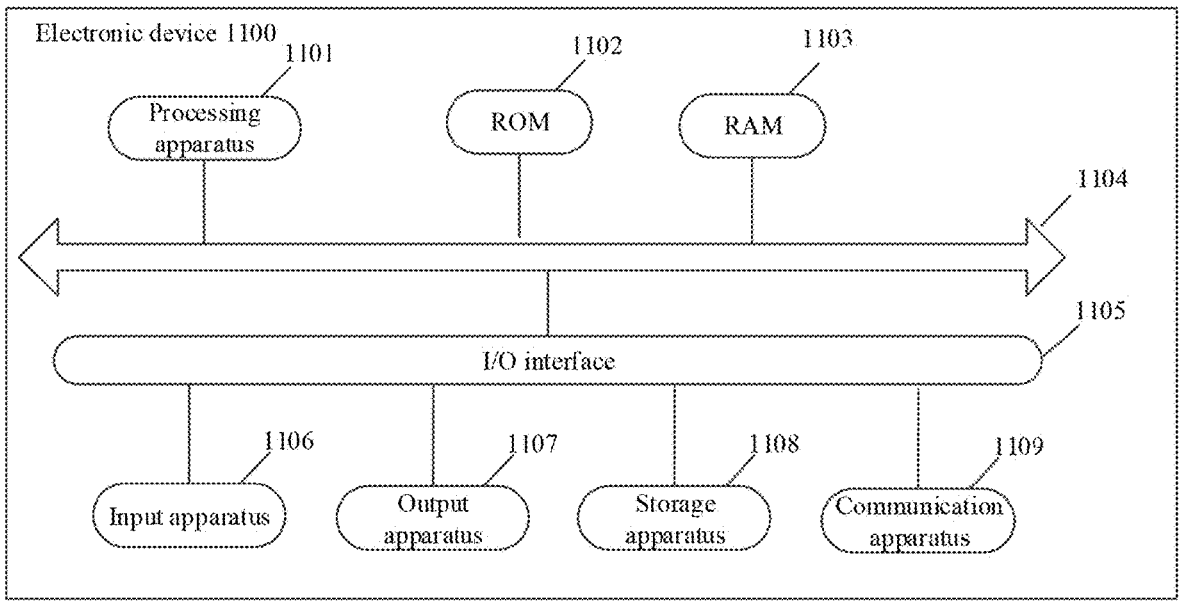
FIG. 11 is a hardware structural schematic diagram of an electronic device according to an embodiment of the present disclosure.

Referring to FIG. 11, it shows a schematic structural diagram of an electronic device 1100 suitable for implementing an embodiment of the present disclosure, and the electronic device 1100 may be a terminal device or a server. The terminal device may include, but is not limited to: a mobile terminal such as a mobile phone, a notebook computer, a digital broadcast receiver, a personal digital assistant (PDA), a tablet computer (PAD), a portable media player (PMP), and an on-vehicle terminal (e.g., an on-vehicle navigation terminal); and a stationary terminal such as a digital TV and a desktop computer, etc. The electronic device shown in FIG. 11 is only an example, which should not bring any limitation to the function and the use range of the embodiments of the present disclosure.

As shown in FIG. 11, the electronic device 1100 may include a processing apparatus (such as a central processor, a graphics processor, etc.) 1101, which may execute various appropriate actions and processes according to programs stored in a read only memory (ROM) 1102 or programs loaded into a random access memory (RAM) 1103 from a storage apparatus 1108. In the RAM 1103, various programs and data required for the operation of the electronic device 1100 are also stored. The processing apparatus 1101, the ROM 1102, and the RAM 1103 are connected to each other through a bus 1104. An input/output (I/O) interface 1105 is also connected to the bus 1104.

Usually, the following apparatuses can be connected to the I/O interface 1105: an input apparatus 1106 including, for example, a touch screen, a touch pad, a keyboard, a mouse, a camera, a microphone, an accelerometer, a gyroscope, etc.; an output apparatus 1107 including, for example, a liquid crystal display (LCD), a speaker, a vibrator, etc.; a storage apparatus 1108 including, for example, a magnetic tape, a hard disk, etc.; and a communication apparatus 1109. The communication apparatus 1109 may allow the electronic device 1100 to perform wireless or wired communication with other devices to exchange data. Although FIG. 11 shows an electronic device 1100 having various apparatuses, it should be understood that it is not required to implement or have all of the apparatuses illustrated. More or fewer apparatuses may alternatively be implemented or provided.

In particular, according to the embodiments of the present disclosure, the process described above with reference to the flow chart can be implemented as a computer software program. For example, an embodiment of the present disclosure includes a computer program product including a computer program carried on a computer readable medium, where the computer program contains program codes for executing the method shown in the flow chart. In such embodiment, the computer program can be downloaded and installed from a network through the communication apparatus 1109, or installed from the storage apparatus 1108 or installed from the ROM 1102. When the computer program is executed by the processing apparatus 1101, the above functions defined in the methods of the embodiments of the present disclosure are executed.

It should be noted that the above computer readable medium in the present disclosure can be a computer readable signal medium or a computer readable storage medium or any combination of the two. The computer readable storage medium can be, for example, but not limited to, an electrical, a magnetic, an optical, an electromagnetic, an infrared, or a semiconductive system, apparatus, or device, or any combination of the above. More specific examples of the computer-readable storage medium may include, but are not limited to, electrically connected portable computer disks with one or more wires, hard disks, random access memories (RAM), read-only memories (ROM), electrically erasable programmable read-only memories (EPROM or flash memory), optical fibers, compact disk read-only memories (CD-ROM), optical storage devices, magnetic storage devices or any suitable combination of the above. In the present disclosure, the computer readable storage medium can be any tangible medium containing or storing a program, where the program can be used by or in connection with an instruction execution system, apparatus or device. And in the present disclosure, the computer readable signal medium may include a data signal propagated in baseband or as a part of a carrier wave in which computer readable program codes are carried. This propagated data signal can adopt various manners, including but not limited to an electromagnetic signal, an optical signal or any suitable combination of the above. The computer readable signal medium can also be any computer readable medium other than a computer readable storage medium, and the computer readable signal medium can send, propagate or transmit a program for use by or in connection with an instruction execution system, apparatus or device. The program codes contained on the computer readable medium can be transmitted by any suitable medium including but not limited to: an electric wire, an optical cable, RF (Radio Frequency), etc., or any suitable combination of the above.

The above computer readable medium may be contained in the above electronic device; or may exist separately instead of being assembled into the electronic device.

The above computer readable medium carries one or more programs, and the one or more programs, when executed by the electronic device, cause the electronic device to execute the methods shown in the above embodiments.

The computer program codes for executing the operations of the present disclosure can be written in one or more programming languages or a combination thereof, where the above programming languages include object-oriented programming languages such as Java, Smalltalk, C++, and also conventional procedural programming languages such as "C" language or similar programming languages. The program codes can be completely executed on the user computer, partially executed on the user computer, executed as an independent software package, partially executed on the user computer and partially executed on a remote computer, or completely executed on a remote computer or a server. In case of involving a remote computer, the remote computer can be connected to the user computer through any kind of networks, including a local area network (LAN) or a wide area network (WAN), or can be connected to an external computer (for example, by using Internet service providers to connect through the Internet).

The flow charts and block diagrams in the drawings illustrate the architecture, functions and operations of possible implementations of systems, methods and computer program products according to various embodiments of the present disclosure. In this regard, each block in the flow charts or block diagrams may represent a module, a program segment, or a part of codes, where the module, the program segment, or the part of codes contains one or more executable instructions for implementing specified logical functions. It should also be noted that in some alternative implementations, the functions indicated in the blocks may also occur in a different order than those indicated in the drawings. For example, two blocks shown one after the other can actually be executed in parallel substantially, or they may sometimes be executed in an opposite order, depending on functions involved. It should also be noted that each block in the block diagrams and/or flow charts, and combinations of blocks in the block diagrams and/or flow charts, can be implemented with a dedicated hardware-based system that performs specified functions or operations, or can be implemented with combinations of dedicated hardware and computer instructions.

An involved unit described in the embodiments of the present disclosure can be implemented by software or hardware. The name of the unit does not constitute a limitation on the unit itself in some cases. For example, a first acquiring unit can also be described as "a unit for acquiring at least two Internet protocol addresses".

The above functions described herein may be performed, at least in part, by one or more hardware logic components. For example, without limitation, exemplary types of hardware logic components that can be used include a field programmable gate array (FPGA), an application specific integrated circuit (ASIC), an application specific standard product (ASSP), a system on chip (SOC), a complex programming logic device (CPLD), etc.

In the context of the present disclosure, the machine readable medium may be a tangible medium that may contain or store a program for use by or in connection with an instruction execution system, apparatus or device. The machine readable medium may be a machine readable signal medium or a machine readable storage medium. The machine readable medium may include, but is not limited to, an electronic, a magnetic, an optical, an electromagnetic, an infrared, or a semiconductive system, apparatus, or device, or any suitable combination of the above contents. More specific examples of the machine-readable storage medium might include electrically connected portable computer disks based on one or more wires, hard disks, random access memories (RAM), read-only memories (ROM), electrically erasable programmable read-only memories (EPROM or flash memory), optical fibers, portable compact disk read-only memories (CD-ROM), optical storage devices, magnetic storage devices, or any suitable combination of the above.

In a first aspect, according to one or more embodiments of the present disclosure, there is provided an information processing method for an animation resource, including:

detecting a project management request initiated by a first user for a target project;

displaying resource file information corresponding to an animation resource of the target project in response to the project management request; and detecting a resource management operation performed by the first user for the resource file information, and determining target file information obtained after execution of the resource management operation;

where the target file information is configured to record resource processing content corresponding to the animation resource of the target project.

According to one or more embodiments of the present disclosure, the detecting the resource management operation performed by the first user for the resource file information and the determining the target file information obtained after execution of the resource management operation include:

displaying the resource file information of the animation resource of the target project in a file list;

detecting the resource management operation triggered by the first user for the resource file information in the file list; and performing a file information change for the resource file information based on the resource management operation to obtain the changed target file information.

According to one or more embodiments of the present disclosure, the detecting the resource management operation triggered by the first user for the resource file information in the file list includes:

displaying, for the resource file information, a file processing control associated therewith in the file list; and detecting a control triggering operation performed by the first user for the file processing control of the resource file information to detect the resource management operation;

the performing the file information change for the resource file information based on the resource management operation to obtain the changed target file information includes:

determining, based on the control triggering operation, a corresponding file processing instruction of the control triggering operation; and running the file processing instruction to perform corresponding file information change processing for the resource file information, so as to obtain the changed target file information.

According to one or more embodiments of the present disclosure, the file processing control includes at least one of the following controls: a file creation control, a map setting control, a resource cutting control, a display repair control and a resource packaging control.

According to one or more embodiments of the present disclosure, before the detecting the project management request initiated by the first user for the target project, the information processing method further includes:

creating the resource file information corresponding to the target project in response to a project creating request triggered by a second user.

According to one or more embodiments of the present disclosure, the creating the resource file information corresponding to the target project in response to the project creating request triggered by the second user includes:

creating, based on a standardized naming rule, an empty project for which no animation resource has been created;

detecting a resource creating request triggered by a user for the empty project; and creating the resource file information corresponding to the animation resource according to the standardized naming rule based on the resource creating request;

the method further includes:

storing the resource file information of the target project into a file database.

According to one or more embodiments of the present disclosure, before the displaying the resource file information corresponding to the animation resource of the target project in response to the project management request, the information processing method further includes:

determining a file database for storing the file resource of the target project; and determining, from the file database, the resource file information of the animation resource in the target project.

According to one or more embodiments of the present disclosure, the determining, from the file database, the resource file information of the animation resource in the target project includes:

determining an intermediate server configured to perform a file information change;

sending a reading request for the resource file information of the target project to the intermediate server, where the reading request is indicative of reading the resource file information from the file database by the intermediate server; and receiving the resource file information of the animation resource in the target project fed back by the intermediate server.

According to one or more embodiments of the present disclosure, the detecting the resource management operation performed by the first user for the resource file information and the determining the target file information obtained after execution of the resource management operation include:

detecting the resource management operation performed by the first user for the resource file information;

generating a corresponding file content changing request based on the resource management operation;

sending the file content changing request to the intermediate server, where the file content changing request is indicative of changing, by the intermediate server, the resource file information into the target file information according to the file content changing request; and receiving the target file information fed back by the intermediate server.

In a second aspect, according to one or more embodiments of the present disclosure, there is provided an information processing method for an animation resource, including:

acquiring target file information of a target project in response to a project initiating operation performed by a third user for the target project, where the target file information is obtained after execution of a resource management operation by a first user for resource file information of the target project;

determining environmental configuration information of the target project by using the target file information; and controlling an animation drawing program to initiate the target project, based on the environmental configuration information, where the animation drawing program is configured to draw a corresponding animation resource according to the target file information of the target project, and the target file information is configured to record resource processing content corresponding to the animation resource of the target project.

According to one or more embodiments of the present disclosure, the determining the environmental configuration information of the target project by using the target file information includes:

determining, based on a standardized naming rule, an information name of the environmental configuration information that corresponds to a file name corresponding to the target file information; and creating the environmental configuration information corresponding to the information name.

According to one or more embodiments of the present disclosure, the acquiring the target file information of the target project includes:

determining an intermediate server configured to perform a file information change;

sending a reading request for the target file information of the target project to the intermediate server, where the reading request is indicative of reading the target file information of the target project from the file database by the intermediate server; and receiving the target file information of the target project fed back by the intermediate server.

In a third aspect, according to one or more embodiments of the present disclosure, there is provided an information processing method for an animation resource, including:

detecting environmental configuration information provided by a software initiating terminal;

parsing the environmental configuration information to determine a target project and target file information of the target project, where the target file information is obtained after execution of a resource management operation by a first user for resource file information of the target project;

generating a project initiating instruction of the target project by using the target file information of the target project; and running the project initiating instruction, initiating the target project and displaying the target file information of the target project, where the target file information is configured to record resource processing content corresponding to the animation resource of the target project.

According to one or more embodiments of the present disclosure, the information processing method further includes:

detecting an animation resource drawn by a fourth user based on the resource processing content recorded in the target file information.

According to one or more embodiments of the present disclosure, after the detecting the animation resource drawn by the fourth user based on the resource processing content recorded in the target file information, the information processing method further includes:

detecting a resource export request triggered by the fourth user for the animation resource, and determining a resource name of the animation resource; and if it is determined that the resource name meets a standardized naming rule, generating target resource data corresponding to the animation resource according to the resource name, and storing the target resource data into a data memory according to a predetermined storage path.

According to one or more embodiments of the present disclosure, after the parsing the environmental configuration information to determine the target project and the target file information of the target project, the information processing method further includes:

determining an intermediate server configured to perform a file information change;

sending a reading request for the target file information of the target project to the intermediate server, where the reading request is indicative of reading the target file information of the target project from the file database by the intermediate server; and receiving the target file information of the target project fed back by the intermediate server.

In a fourth aspect, according to one or more embodiments of the present disclosure, there is provided an information processing apparatus for an animation resource, including:

a request detection unit, configured to detect a project management request initiated by a first user for a target project;

a request response unit, configured to display resource file information corresponding to an animation resource of the target project in response to the project management request; and a file adjustment unit, configured to detect a resource management operation performed by the first user for the resource file information, and determine target file information obtained after execution of the resource management operation;

where the target file information is configured to record resource processing content corresponding to the animation resource of the target project.

In a fifth aspect, according to one or more embodiments of the present disclosure, there is provided an information processing apparatus for an animation resource, including:

an initiation response unit, configured to acquire target file information of a target project in response to a project initiating operation performed by a third user for the target project, where the target file information is obtained after execution of a resource management operation by a first user for resource file information of the target project;

an environment configuration unit, configured to determine environmental configuration information of the target project by using the target file information; and a project initiating unit, configured to control an animation drawing program to initiate the target project, based on the environmental configuration information, where the animation drawing program is configured to draw a corresponding animation resource according to the target file information of the target project, and the target file information is configured to record resource processing content corresponding to the animation resource of the target project.

In a sixth aspect, according to one or more embodiments of the present disclosure, there is provided an information processing apparatus for an animation resource, including:

an information acquiring unit, configured to detect environmental configuration information provided by a software initiating terminal;

an information parsing unit, configured to parse the environmental configuration information to determine a target project and target file information of the target project, where the target file information is obtained after execution of a resource management operation by a first user for resource file information of the target project;

an instruction generating unit, configured to generate a project initiating instruction of the target project by using the target file information of the target project; and an instruction running unit, configured to run the project initiating instruction, initiate the target project and display the target file information of the target project, where the target file information is configured to record resource processing content corresponding to the animation resource of the target project.

In a seventh aspect, according to one or more embodiments of the present disclosure, there is provided an electronic device including at least one processor and a memory; where the memory stores computer-executable instructions;

the at least one processor executes the computer-executable instructions stored in the memory, so as to cause the at least one processor to execute the information processing method for the animation resource according to the above first aspect, second aspect, third aspect or various possible designs of various aspects.

In an eighth aspect, according to one or more embodiments of the present disclosure, there is provided a computer readable storage medium storing computer-executable instructions which, when executed by a processor, implement the information processing method for the animation resource according to the above first aspect, second aspect, third aspect or various possible designs of various aspects.

In a ninth aspect, according to one or more embodiments of the present disclosure, there is provided a computer program product including a computer program which, when executed by a processor, implements the information processing method for the animation resource according to the above first aspect, second aspect, third aspect or various possible designs of various aspects.

In a tenth aspect, according to one or more embodiments of the present disclosure, there is provided a computer program which, when executed by a processor, implements the information processing method for the animation resource according to the above first aspect, second aspect, third aspect or various possible designs of various aspects.

The above description is only a description of preferred embodiments of the present disclosure and applied technical principles. It should be understood by those skilled in the art that the disclosure scope involved in the present disclosure is not limited to the technical solution formed by the specific combination of the above technical features, but also covers other technical solutions formed by any combination of the above technical features or equivalent features thereof without departing from the above disclosure concept, such as the technical solution formed by replacing the above features with the technical features with similar functions disclosed in (but not limited to) the present disclosure.

In addition, although the operations are depicted in a particular order, this should not be understood as a requirement that the operations should be performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of separate embodiments may also be implemented in a single embodiment in combination. On the contrary, various features described in the context of a single embodiment can also be implemented in multiple embodiments individually or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are merely exemplary forms for implementing the claims.

What is claimed is:

1. An information processing method for a computer animation resource of a computer animation development project, wherein the method is applied to a resource management terminal, and the method comprises:

detecting a project management request initiated by a first user for a target project of computer animation development;

displaying resource file information corresponding to a computer animation resource of the target project in response to the project management request; and detecting a resource management operation triggered by the first user on the resource file information, and determining target file information obtained after the resource management terminal performs the resource management operation;

wherein the target file information is used for recording resource processing content corresponding to the computer animation resource of the target project;

wherein before the displaying the resource file information corresponding to the computer animation resource of the target project in response to the project management request, the method further comprises:

determining a file database for storing the resource file information of the target project; and determining, from the file database, the resource file information corresponding to the computer animation resource of the target project;

wherein the target file information is sent from the resource management terminal to an intermediate server, and is sent from the intermediate server to the file database, and wherein the resource file information in the file database is updated to be the target file information, so that a software initiating terminal is able to acquire the target file information of the target project from the file database.

2. The method according to claim 1, wherein the detecting the resource management operation triggered by the first user on the resource file information and the determining the target file information obtained after the resource management terminal performs the resource management operation comprise:

displaying the resource file information corresponding to the computer animation resource of the target project in a file list;

detecting the resource management operation triggered by the first user on the resource file information in the file list; and performing a file information change for the resource file information based on the resource management operation to obtain the target file information.

3. The method according to claim 2, wherein the detecting the resource management operation triggered by the first user on the resource file information in the file list comprises:

displaying, for the resource file information, a file processing control associated therewith in the file list; and detecting a control triggering operation triggered by the first user for the file processing control of the resource file information, to detect the resource management operation; and the performing the file information change for the resource file information based on the resource management operation to obtain the target file information comprises:

determining, based on the control triggering operation, a corresponding file processing instruction of the control triggering operation; and running the file processing instruction to perform corresponding file information change processing for the resource file information, so as to obtain the target file information.

4. The method according to claim 3, wherein the file processing control comprises at least one of the following controls: a file creation control, a map setting control, a resource cutting control, a display repair control and a resource packaging control.

5. The method according to claim 1, before the detecting the project management request initiated by the first user for the target project, further comprising:

creating the resource file information corresponding to the target project in response to a project creating request triggered by a second user.

6. The method according to claim 5, wherein the creating the resource file information corresponding to the target project in response to the project creating request triggered by the second user comprises:

creating, based on a standardized naming rule, an empty project of computer animation development, for which no computer animation resource has been created;

detecting a resource creating request triggered by a user for the empty project; and creating the resource file information corresponding to the computer animation resource according to the standardized naming rule based on the resource creating request; and wherein after the determining the file database for storing the resource file information of the target project, the method further comprises:

storing the resource file information of the target project into the file database.

7. The method according to claim 1, wherein the determining, from the file database, the resource file information corresponding to the computer animation resource of the target project comprises:

determining the intermediate server used for performing a file information change;

sending a reading request for the resource file information of the target project to the intermediate server, wherein the reading request is indicative of reading the resource file information from the file database by the intermediate server; and receiving the resource file information corresponding to the computer animation resource of the target project fed back by the intermediate server.

8. The method according to claim 7, wherein the detecting the resource management operation triggered by the first user on the resource file information and the determining the target file information obtained after the resource management terminal performs the resource management operation comprise:

generating a corresponding file content changing request based on the resource management operation;

sending the file content changing request to the intermediate server, wherein the file content changing request is indicative of changing, by the intermediate server, the resource file information into the target file information according to the file content changing request; and receiving the target file information fed back by the intermediate server.

9. An information processing method for a computer animation resource of a computer animation development project, wherein the method is applied to a software initiating terminal, and the method comprises:

acquiring target file information of a target project of computer animation development from a file database in response to a project initiating operation triggered by a third user for the target project, wherein the target file information is obtained after a resource management terminal performs a resource management operation triggered by a first user on resource file information of the target project in the file database;

determining environmental configuration information of the target project by using the target file information; and controlling a computer animation drawing program installed on the software initiating terminal to initiate the target project based on the environmental configuration information, wherein the computer animation drawing program is used for drawing a corresponding computer animation resource according to the target file information of the target project, and the target file information is used for recording resource processing content corresponding to the computer animation resource of the target project.

10. The method according to claim 9, wherein the determining the environmental configuration information of the target project by using the target file information comprises:

determining, based on a standardized naming rule, an information name of the environmental configuration information that corresponds to a file name corresponding to the target file information; and creating the environmental configuration information corresponding to the information name.

11. The method according to claim 9, wherein the acquiring the target file information of the target project of computer animation development from the file database comprises:

determining an intermediate server used for performing a file information change;

sending a reading request for the target file information of the target project to the intermediate server, wherein the reading request is indicative of reading the target file information of the target project from the file database by the intermediate server; and receiving the target file information of the target project fed back by the intermediate server.

12. An information processing method for a computer animation resource of a computer animation development project, wherein the method is applied to a software initiating terminal on which a computer animation drawing program is installed, and the method comprises:

detecting environmental configuration information in the software initiating terminal;

parsing the environmental configuration information to determine a target project of computer animation development and target file information of the target project, wherein the target file information is obtained after a resource management terminal performs a resource management operation triggered by a first user on resource file information of the target project in a file database, and the target file information of the target project is acquired, by the software initiating terminal, from the file database;

generating a project initiating instruction of the target project by using the target file information of the target project; and running the project initiating instruction, initiating the target project and displaying the target file information of the target project, wherein the target file information is used for recording resource processing content corresponding to the computer animation resource of the target project.

13. The method according to claim 12, further comprising:

detecting a computer animation resource drawn by a fourth user based on the resource processing content recorded in the target file information.

14. The method according to claim 13, after the detecting the computer animation resource drawn by the fourth user based on the resource processing content recorded in the target file information, further comprising:

detecting a resource export request triggered by the fourth user for the computer animation resource, and determining a resource name of the computer animation resource; and if it is determined that the resource name meets a standardized naming rule, generating target resource data corresponding to the computer animation resource according to the resource name, and storing the target resource data into a data memory according to a predetermined storage path.

15. The method according to claim 12, before the parsing the environmental configuration information to determine the target project of computer animation development and the target file information of the target project, further comprising:

determining an intermediate server used for performing a file information change;

sending a reading request for the target file information of the target project to the intermediate server, wherein the reading request is indicative of reading the target file information of the target project from the file database by the intermediate server; and receiving the target file information of the target project fed back by the intermediate server.

16. An electronic device comprising at least one processor and a memory;

wherein the memory stores computer-executable instructions;

the at least one processor executes the computer-executable instructions stored in the memory to cause the at least one processor to implement the information processing method for the computer animation resource of the computer animation development project according to claim 1.

17. An electronic device comprising at least one processor and a memory;

wherein the memory stores computer-executable instructions;

the at least one processor executes the computer-executable instructions stored in the memory to cause the at least one processor to implement the information processing method for the computer animation resource of the computer animation development project according to claim 9.

18. An electronic device comprising at least one processor and a memory;

wherein the memory stores computer-executable instructions;

the at least one processor executes the computer-executable instructions stored in the memory to cause the at least one processor to implement the information processing method for the computer animation resource of the computer animation development project according to claim 12.

19. A non-transitory computer-readable storage medium storing computer-executable instructions, wherein when the instructions are executed by a processor, the information processing method for the computer animation resource of the computer animation development project according to claim 1 is implemented.

\* \* \* \* \*